James M. Clark's Combined Breast Developer, Beautifier and Health Promoter.
71459
PATENTED NOV 26 1867
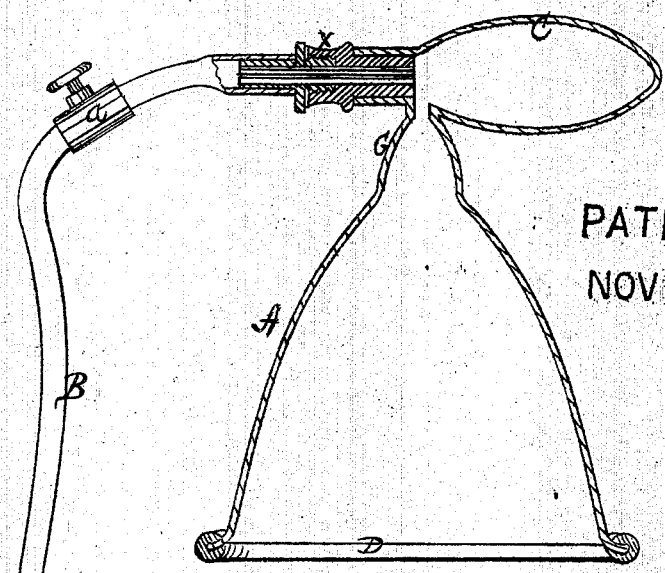
Witnesses
Inventor
James M. Clark

United States Patent Office.

JAMES M. CLARK, OF LANCASTER, PENNSYLVANIA.

Letters Patent No. 71,459, dated November 26, 1867.

PNEUMATIC BREAST-DEVELOPER.

*The Schedule referred to in these Letters Patent and making part of the same.*

TO ALL WHOM IT MAY CONCERN:

Be it known that I, JAMES M. CLARK, of Lancaster, in the county of Lancaster, and in the State of Pennsylvania, have invented a certain Pneumatic Combined Breast-Developer; and do hereby declare that the following is a full, clear, and exact description thereof, reference being had to the accompanying drawings and to the letters of reference marked thereon, making a part of this specification.

The subject of my invention is a pneumatic apparatus, designed to be used under advice of a medical practitioner, or such instructions as will prevent danger of injury, and adapted to promote a healthful development of the breasts of females, and, without violence or injury, relieve them of a superabundance of milk.

In the annexed drawings, A represents a mould or cup, made in the form of a female breast, having a nipple, G, formed upon its outer extremity. C represents a cup, which is prolonged from the mouth or opening of the nipple G, and into which the milk from the breast is received. This cup may be made of any suitable shape, and may be formed either of the same piece as the cup A, or may be separate, of glass, rubber, or other material, and connected to the main cup A. It will be seen that there is a small opening in the end of the nipple for the passage of the milk into this cup, C, and to produce the vacuum in the main cup A, as will be set forth hereafter. Upon the base of the cup A is placed a pad or cushion, D, for the protection of the chest, and at the same time making an air-tight joint. This cushion may be of India rubber, or any other suitable material, and connected around the entire circumference of the base of cup. Connected to the upper or forward end of the supplemental cup C is attached a flexible pipe, B, (at x,) having a stop-cock placed upon it, a, or other suitable mechanical device for cutting off communication between the cup and the mouth-piece E, at the extremity of this tube. In lieu of this tube can be used a rubber or other bulb, E, Figure 2, or an ordinary pump, as seen in Figure 3.

It will be seen that this device is intended to be placed over the breast of the female, and a vacuum formed by means of the tube mouth-piece and the lungs of the operator. The vacuum thus formed will cause the breast to expand and fill the cup, and thereby form a nipple within the recess G.

The supplemental cup C is intended for extracting the overplus of milk, which extraction is attended with great pain when suckling the infant or by the use of the ordinary breast-pump, which necessarily will bear upon the tender point of the breast. By this simple and practical invention the milk is drawn from the breast, or the breast enlarged and fully developed, by the action of the operator.

By the various modes of dressing and from other causes the female breast has or will become depressed, deformed, or otherwise assume a shape foreign to that which nature gave it. This physiological invention is intended to obviate the difficulty above described, and will relieve the young mother from her troubles, or develop, beautify, and expand the bosom of the female.

This mould or cup may be made of glass or any other suitable material, and of the various sizes, to correspond with the breast desired. Should the operator desire, she can form a partial vacuum in the cup or vessel C by the use of the pipe and mouth-piece, and, when this is done, the stop-cock on the pipe may be turned, closing the pipe, so that the process of drawing the milk from the breast will be carried on in and by the vessel C. When said vessel is filled, it may be emptied by removing the mould, or the milk may be drawn from it by the infant through a proper nipple placed upon the end of the pipe.

Having thus fully described my invention, what I claim as new, and desire to secure by Letters Patent, is—

1. The combination of the mould A, conformed to the shape of the female breast, and adapted to completely enclose the same, while pressing only on the sternum, the nipple-recess G, and a suitable exhausting-device, for the purposes set forth.

2. In combination with the above, I further claim the supplemental cup C, for the purpose set forth.

In testimony that I claim the foregoing, I have hereunto set my hand this     day of     , 1867.

JAMES M. CLARK.

Witnesses:
C. M. ALEXANDER,
J. M. MASON.